(12) United States Patent
Bonti et al.

(10) Patent No.: US 10,832,350 B2
(45) Date of Patent: Nov. 10, 2020

(54) SYBIL IDENTIFICATION MECHANISM FOR FRAUDULENT DOCUMENT DETECTION THROUGH A COGNITIVE BASED PERSONAL ENCRYPTION KEY

(71) Applicant: International Business Machine Corporation, Armonk, NY (US)

(72) Inventors: Alessio Bonti, Melbourne (AU); Lianhua Chi, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 15/420,970

(22) Filed: Jan. 31, 2017

(65) Prior Publication Data

US 2018/0219670 A1 Aug. 2, 2018

(51) Int. Cl.
*H04L 9/08* (2006.01)
*G06Q 50/00* (2012.01)
*G06N 5/02* (2006.01)
*H04L 9/32* (2006.01)

(52) U.S. Cl.
CPC ............ *G06Q 50/01* (2013.01); *G06N 5/022* (2013.01); *H04L 9/0866* (2013.01); *H04L 9/3231* (2013.01)

(58) Field of Classification Search
CPC .... G06F 21/32; G06F 16/9535; G06F 21/316; H04L 67/306; H04L 9/0866; H04L 9/3231
See application file for complete search history.

(56) References Cited

U.S. PATENT DOCUMENTS

| 7,725,421 | B1 | 5/2010 | Gedalius et al. | |
|---|---|---|---|---|
| 8,955,129 | B2 | 2/2015 | Cao et al. | |
| 9,372,927 | B1 | 6/2016 | Fredinburg et al. | |
| 9,648,030 | B2 * | 5/2017 | Kadashevich | H04L 63/08 |
| 2013/0232159 | A1 * | 9/2013 | Daya | G06F 16/337 707/758 |
| 2014/0040152 | A1 | 2/2014 | Fang et al. | |
| 2014/0258169 | A1 * | 9/2014 | Wong | G06Q 30/0282 705/347 |
| 2015/0188941 | A1 * | 7/2015 | Boshmaf | H04L 63/1441 726/22 |
| 2015/0370801 | A1 * | 12/2015 | Shah | G06Q 30/0282 707/728 |
| 2016/0162488 | A1 * | 6/2016 | Corradi | G06Q 10/1053 707/734 |
| 2018/0077146 | A1 * | 3/2018 | Lonas | G06F 21/604 |

* cited by examiner

*Primary Examiner* — Trang T Doan
(74) *Attorney, Agent, or Firm* — Stephen R. Yoder (57) ABSTRACT

An embodiment of the invention provides a method of monitoring for fraudulent activity where a key generating device generates a first key based on a writing profile of a user, and where the key indicates the writing style of the user. The generation of the key includes generating trait scores for writing style traits, where the writing style traits includes an agreeableness trait, a conscientiousness trait, an extraversion trait, an emotional range trait, and an openness trait. The key generating device generates a second key based on a document, where the second key indicates the writing style of the author of the document. A processor compares the first key to the second key to determine the degree of dissimilarity between the writing style of the user and the writing style of the author of the document.

20 Claims, 6 Drawing Sheets

SYBIL IDENTIFICATION MECHANISM FOR FRAUDULENT DOCUMENT DETECTION THROUGH A COGNITIVE BASED PERSONAL ENCRYPTION KEY

FIELD OF THE INVENTION

The present invention relates to systems, methods, and computer program products for a Sybil identification mechanism for fraudulent documents detection through a cognitive based personal encryption key.

BACKGROUND

A Sybil attack in computer security is an attack where a system is subverted when an individual forges multiple identities. E-commerce and online social networks are often flooded with information about products and services. Such system can be subject to malicious activity because there can be financial consequences for products or services with either good or poor consumer reviews. This is often done through fake reviews produced by a single person (or a small group of people) who create multiple accounts, hence impersonating many reviewers.

SUMMARY OF THE INVENTION

An embodiment of the invention provides a method of monitoring for fraudulent activity where a key generating device generates a first key based on a writing profile of a user, and where the key indicates the writing style of the user. The generation of the key includes generating trait scores for writing style traits, where the writing style traits includes an agreeableness trait, a conscientiousness trait, an extraversion trait, an emotional range trait, and an openness trait. The key generating device generates a second key based on a document, where the second key indicates the writing style of the author of the document. A processor compares the first key to the second key to determine the degree of dissimilarity between the writing style of the user and the writing style of the author of the document.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system that detects a Sybil attack using cognitive computing. More specifically, a signature key can be created based on a writer's writing style, which when applied to a written document, can help find out if the document belongs to the writer account or if the writer account has been impersonated. As used herein, the term "document" includes reviews, ratings, and comments, for example, as entered by a user in a product/service review website. The system can also apply the signature key to documents to determine if an author is creating reviews using multiple accounts. In this case, the signature of the document may resemble similarities with other accounts.

Cognitive computing can be based on the assumption that once a person has grown to a certain age, he or she has developed a certain personality that can be traced back to his or her writing style, within a threshold, for as much as a person will try, the writing style may eventually reflect back to the person's personality. It may be very difficult to have completely different personalities that will reflect the same writing style. In at least one embodiment, the system analyzes a person's writing history, for example social media websites (facebook, twitter), online sites, blogs etc., to analyze the corpus of the text and create a personal key, similar to a personal signature, which can be used to identify whether text realistically belongs to the person that claims it.

Figure 1:
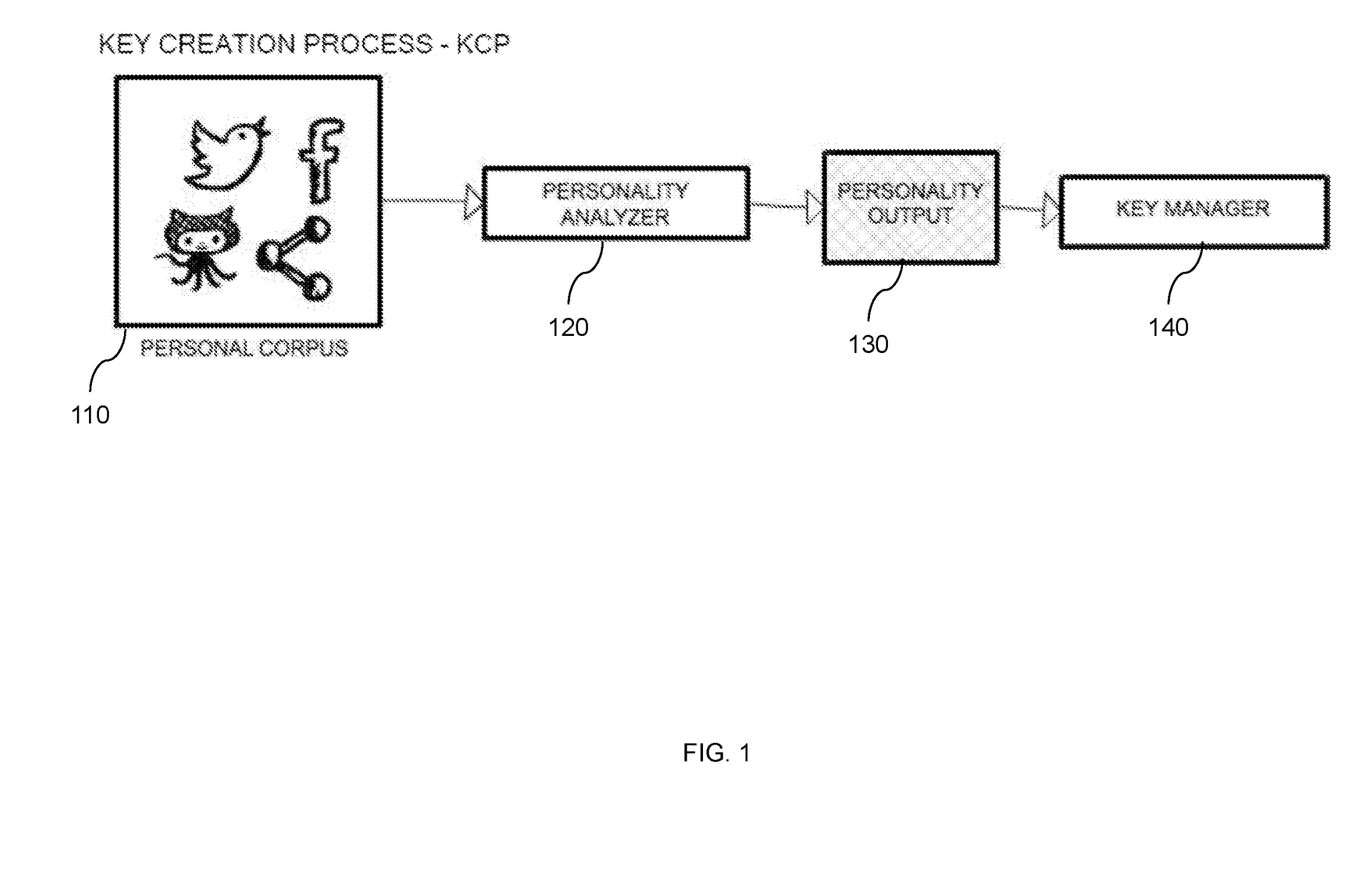
FIG. 1 is a diagram illustrating a key creation process according to an embodiment of the invention.

FIG. 1 is a diagram illustrating a key creation process according to at least one embodiment of the invention, where text written by a user (e.g., acquired from social media, blogs, etc.) is used to create a personal corpus 110. Data from the personal corpus 110 can be input into a personality analyzer device 120, which can generate a personality output 130, which is a set of scores based on personal traits in the personal corpus 110. Based on this analysis, the personality output 130 can be input into a key manager 140, which can create a key specific for the user.

Figure 2:
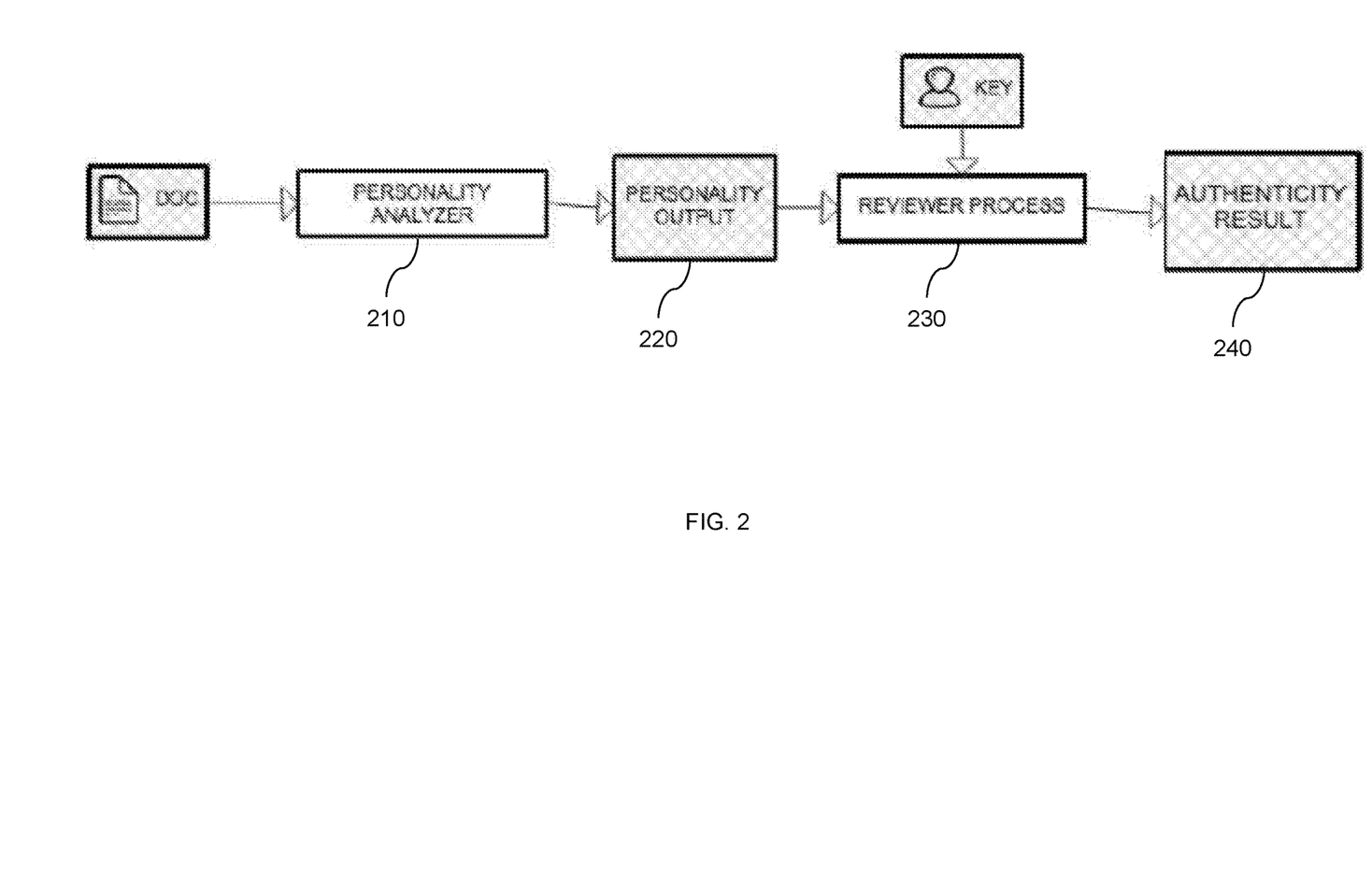
FIG. 2 is a diagram illustrating a key verification process according to an embodiment of the invention.

If a new document written by the user is input into the personality analyzer 120, the system can match the new document to the user. FIG. 2 is a diagram illustrating a key verification process according to at least one embodiment of the invention, which may use the system illustrated in FIG. 1. The new document can be ingested and analyzed through the personality analyzer, 210; and, the personality analyzer can provide a personality output similar to the personality output created by the key creation process from the personal corpus, 220. The reviewer process can receive as input the user key and the personality output, 230. An authenticity result can be produced by the reviewer process by using a distance calculator to identify how far the two personality outputs are from one another 240. If the distance between the two personality outputs is short, then the system can identify that the new document as authentic.

Figure 3:
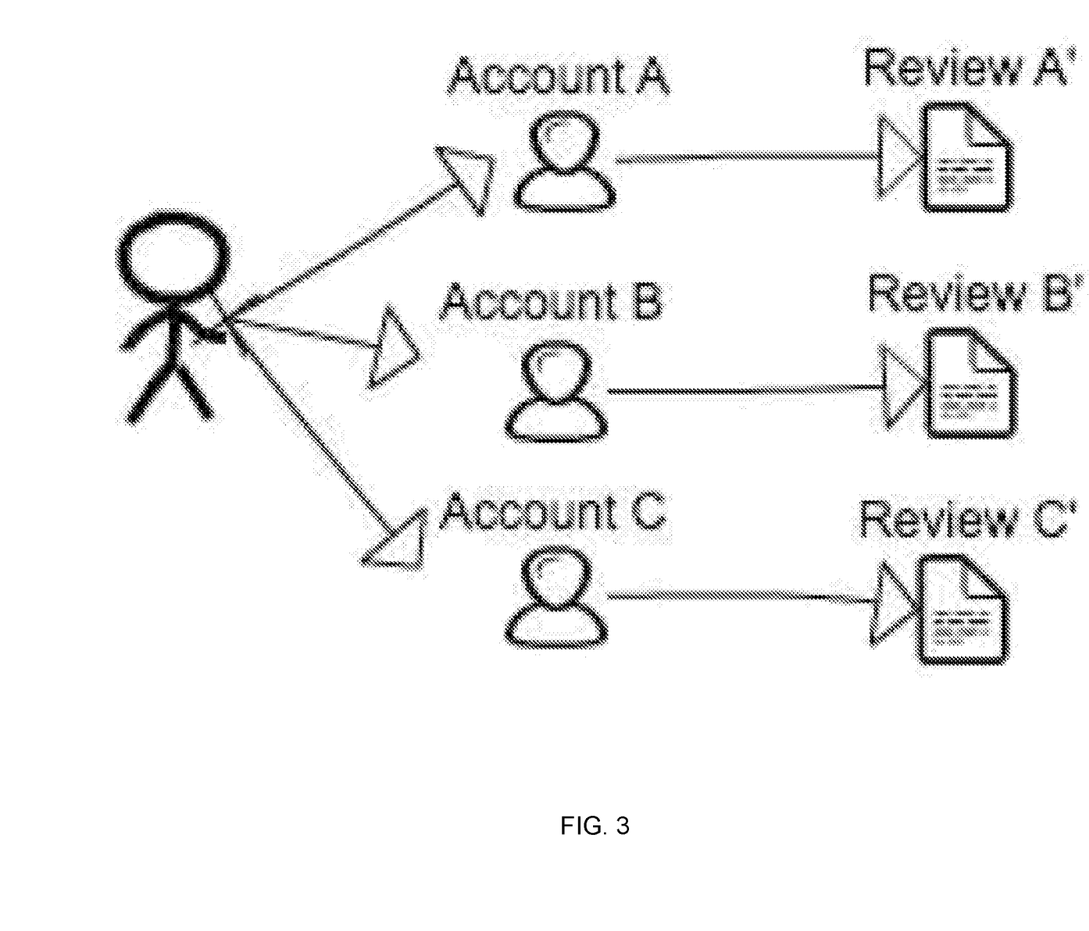
FIG. 3 is a diagram illustrating a system where a single user has multiple accounts according to an embodiment of the invention

FIG. 3 is a diagram illustrating a hotel rating system according to an embodiment of the invention, where a physical user has created multiple accounts with the intent to subjugate a hotel rating system in order to promote a particular hotel. The user can have an account to which is connected a personal cognitive key (referred to hereinafter as the "key signature"). In at least one embodiment, the key signature is created following the key creation process, and is updated in the same way, as a document is ingested into the corpus, the process is reset and the key updated. Because at the beginning of the process the key is "empty", a threshold is defined within the checking system to skip the key verification process until the key is stable. The threshold can be application specific. A newly created account on a review website may not be able to comment on an existing review until the key becomes stable.

When a user submits a document to the system (e.g., a review or a comment for a specific business, such as a restaurant), the system can activate the key verification process. If the key is unstable because the account was just recently created (i.e., the corpus does has not met a threshold size to create a profile), then the verification can be skipped or handled according to the specific system. If the verification fails because from the reviewer process, the distance between document and key signature is too great, an alarm event can be triggered. How the alarm will be handled can be implementation specific.

The new document can be added to the user's corpus, which can trigger the key creation process and can update the current key-signature for the user. The key creation process can be repeated every time the personal corpus is updated. The system can then verify whether the author is authentic. If the verification is positive, it can be assumed that the author of the new document is also the corresponding user of the account.

The system's other functionality can detect the possibility of Sybil accounts. The personality output of a current document can be verified against all of the key-signatures in the system except the author's. If the system verifications return positive, then the accounts can be flagged for possibly being Sybil accounts. In at least one embodiment, these accounts are flagged and an alarm event is triggered to identify these accounts as possibly belonging to the same person (the author's).

Figure 4:
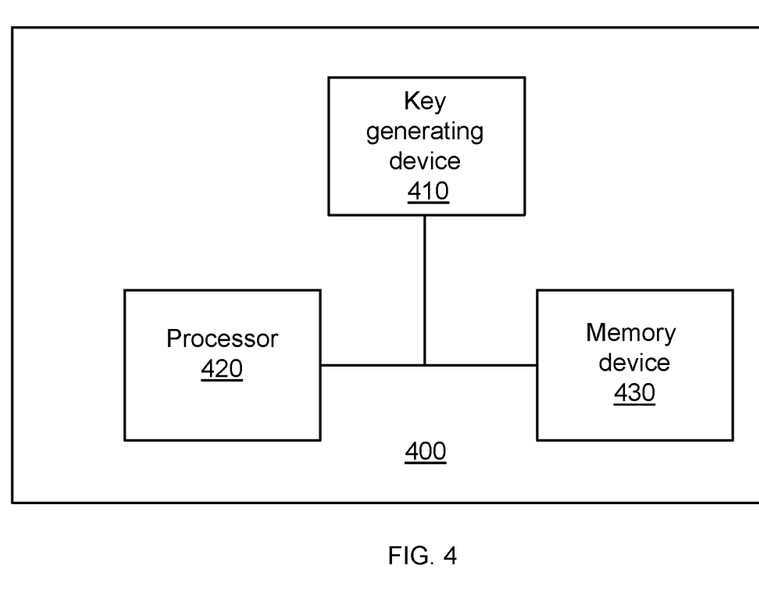
FIG. 4 is diagram illustrating a Sybil identification system for fraudulent documents detection through a cognitive based personal encryption key according to another embodiment of the present invention.
Figure 5:
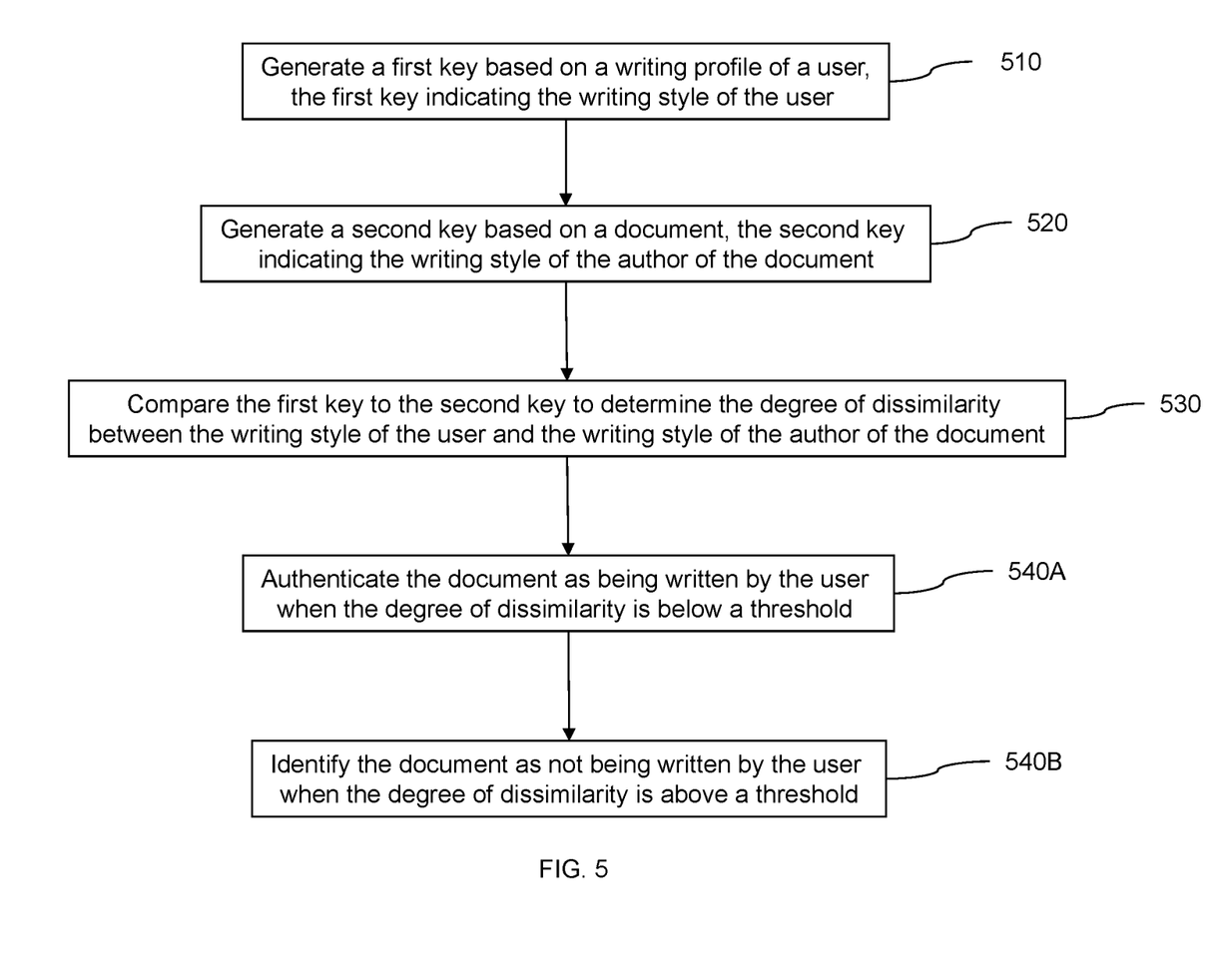
FIG. 5 is a flow diagram illustrating a method for Sybil identification for fraudulent documents detection through a cognitive based personal encryption key according to an embodiment of the present invention.

FIG. 4 is diagram illustrating a Sybil identification system 400 for fraudulent documents detection through a cognitive based personal encryption key according to another embodiment of the present invention. The Sybil identification system 400 can include a key generating device 410, a processor 420, and a storage device 430. FIG. 5 is a flow diagram illustrating a method for Sybil identification for fraudulent documents detection through a cognitive based personal encryption key according to an embodiment of the present invention (e.g., using the system 400).

As used herein the term "key generating device" includes a computer hardware device connected to the processor 120, such as, for example, a CPU, integrated circuit, or microprocessor. As used herein, the term "connected" includes operationally connected, logically connected, in communication with, physically or wirelessly connected, engaged, coupled, contacts, linked, affixed, and attached. The key generating device 410 can generate a first key based on a writing profile of a user, where the first key can indicate the writing style of the user 510.

In generating the first key, the key generating device 410 can generate trait scores (e.g., numerical score between 1-100) for writing style traits. The writing style traits can include an agreeableness trait, a conscientiousness trait, an extraversion trait, an emotional range trait, and/or an openness trait. The trait scores can be generated based on the sub-trait scores (e.g., numerical score between 1-100) of each trait.

For instance, the agreeableness trait can includes an altruism sub-trait, a cooperation sub-trait, a modesty sub-trait, a morality sub-trait, a sympathy sub-trait, and/or a trust sub-trait. The conscientiousness trait can include an achievement-striving sub-trait, a cautiousness sub-trait, a dutifulness sub-trait, an orderliness sub-trait, a self-discipline sub-trait, and/or a self-efficacy sub-trait. The extraversion trait can include an activity level sub-trait, a cheerfulness sub-trait, an excitement-seeking sub-trait, a friendliness sub-trait, and/or a gregariousness sub-trait. The emotional range trait can include an anger sub-trait, an anxiety sub-trait, a depression sub-trait, an immoderation sub-trait, a self-consciousness sub-trait, and/or a vulnerability sub-trait. The openness trait can include an adventurousness sub-trait, an artistic interests sub-trait, an emotionality sub-trait, an imagination sub-trait, an intellect sub-trait, and/or a liberalism sub-trait.

The key generating device 410 can update the writing profile of the user based on new document(s) written by the user obtained by the processor 430 from a web log (a.k.a., blog) authored by the user, a social media post authored by the user, a product review authored by the user, a service review authored by the user, and/or a comment authored by the user. The profile of the user can include multiple documents written by the user. The key generating device 410 can update the first key when the writing profile of the user is updated.

In at least one embodiment, the key generating device 410 generates a second key based on a document, where the second key indicates the writing style of the author of the document 520. The key generating device 410 can generate the second key in the same manner in which the first key is generated (e.g., from trait scores and sub-trait scores). The processor 420 can store the first key and the second key in the storage device 430 (e.g., memory). As used herein the term "processor" includes a computer hardware device connected to the key generating device 410, such as, for example, a CPU, integrated circuit, or microprocessor.

The processor 420 can compare the first key to the second key to determine the degree of dissimilarity between the writing style of the user and the writing style of the author of the document 530. The processor 420 can authenticate the document as being written by the user when the degree of dissimilarity is below a threshold 540A (e.g., 9). Conversely, the processor 420 can identify the document as not being written by the user when the degree of dissimilarity is above a threshold 540B (e.g., 11). In at least one embodiment, the threshold in item 540A can be the same as the threshold in item 540B. The hashed lines in FIG. 5 indicate that the method can proceed to item 540A or 540B.

For example, the key generating device 410 generates a key indicating the writing style of User A based on social media posts, blogs, and online comments of User A. The key can be a number between 1 and 100. In this example, User A's key is 71. The key generating device 410 can generate a second key based on Document X (e.g., a restaurant review). In this example, Document X's key is 82. The processor 430 can compare the key (e.g., 71) to the second key (e.g., 82). In this example, because the degree of dissimilarity is above the threshold (e.g., 10 points), the document is not authenticated. In at least one embodiment, each key includes multiple values (e.g., the first key={value a=25, value b=40, value c=12 . . . value x=15; the second key={value a=25, value b=38, value c=15 . . . value x=16; }. When comparing the first key and the second key in this example, the values of the first key are summed and compared to the summed value of the second key.

In at least one embodiment of the invention, key generating device 410 generates keys of multiple documents from different accounts, and where each account has a different user name. For example, Document A is from Account A and is authored by User A; Document B is from Account B and is authored by User B; Document C is from Account C and is authored by User C; and, Document D is from Account D and is authored by User D. The processor 430 can compare the keys of the documents to determine the degrees of dissimilarity between the multiple documents. For example, Key A (e.g., 66) of Document A is compared Key B (e.g., 68) of document B, Key C (e.g., 66) of Document C, and Key D (e.g., 62) of Document D; Key B is compared Key C and Key D; and, Key C is compared to Key D.

The processor 430 can identify a Sybil attack when a threshold number of keys (e.g., 3) have a threshold degree of similarity (e.g., within 3 points) with a threshold number of other keys (e.g., 2). For example, there are three keys (e.g., Keys A, B and C) that have a threshold degree of similarity (e.g., within 3 points) with a threshold number of other keys (e.g., 2): Key A is within 3 points of Keys B and C; Key B is within 3 points of Keys A and C; and Key C is within 3 points of Keys A and B. The processor 430 can authenticate the accounts as non-forged accounts when a first threshold number of keys (e.g., 9 out of 10 keys) have a degree of dissimilarity (e.g., 5 point or more differential) with a second threshold number of keys (e.g., 8 out of 10 keys).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
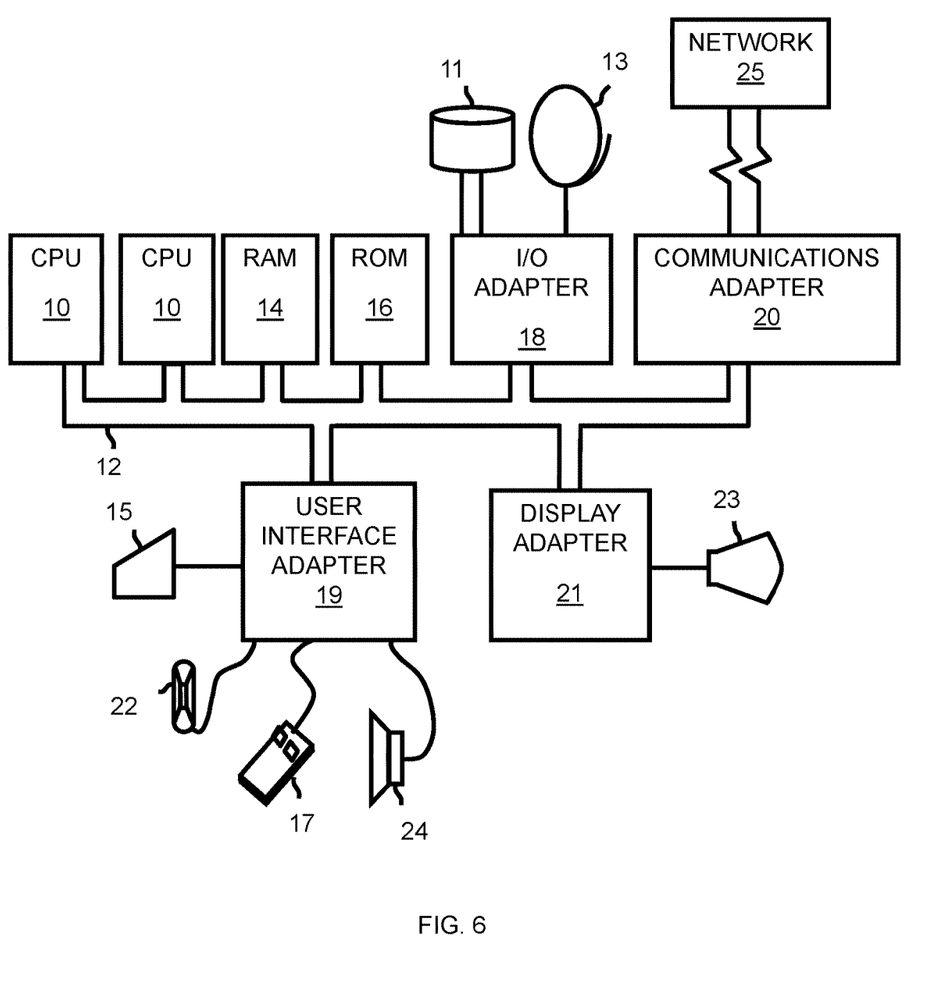
FIG. 6 is a diagram illustrating a computer program product according to an embodiment of the present invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 14, or other program storage devices that are readable by the system. The system can read the inventive instructions on the program storage devices and follow these instructions to execute the methodology of at least one embodiment of the invention. The system further includes a user interface adapter 14 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 24 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
analyzing a set of writing samples provided by a user for evidence of each writing style trait of pre-defined writing style traits;
assigning a sub-trait score for each writing style trait, the sub-trait score indicating the amount of evidence of the writing style trait in the set of writing samples;
establishing a writing profile for a user in a database including a first account for which the user is a registered owner, a first key score indicating a writing style of the user, and documents on which the first key score is based;
generating the first key score by a key generating device associated with the writing profile of the user, the first key score indicating a first writing style according to an aggregate sub-trait score being a mathematical combination of sub-trait scores of each writing style trait;
recording to the writing profile of the user the first key score and the set of writing samples;
generating a second key score by the key generating device based on a first document posted by the first account, the second key score indicating a second writing style exhibited by the first document;
comparing the first key score to the second key score to determine a degree of dissimilarity between the first writing style and the second writing style;
assigning authorship of the first document to the user based on the first key score and the second key score having a degree of dissimilarity below a threshold level; and
monitoring for a second document to be posted by the first account.

2. The method according to claim 1, wherein authorship of the first document is not assigned to:
the user when the degree of dissimilarity between the first key score and second key score is above the threshold level.

3. The method according to claim 1, further comprising:
updating the writing profile of the user based on the second key score for the first document, wherein the writing profile is based on aggregate sub-trait scores of a plurality of documents written by the user including the first document.

4. The method according to claim 1, wherein the set of writing samples is obtained from at least one member of the group consisting of: (i) a web log associated with the first account, (ii) a social media post by the first account, (iii) a product review posted by the first account, (iv) a service review posted by the first account, and (v) a comment posted by the first account.

5. The method according to claim 1, further comprising:
determining a Sybil attack has occurred when a threshold number of key scores for documents in product reviews on a website have a degree of dissimilarity below the threshold level.

6. The method according to claim 1, wherein, the pre-defined writing style traits include an agreeableness trait, a conscientiousness trait, an extraversion trait, an emotional range trait, and an openness trait.

7. The method according to claim 6, wherein:
the agreeableness trait includes at least one of an altruism sub-trait, a cooperation sub-trait, a modesty sub-trait, a morality sub-trait, a sympathy sub-trait, and a trust sub-trait;
the conscientiousness trait includes at least one of an achievement-striving sub-trait, a cautiousness sub-trait, a dutifulness sub-trait, an orderliness sub-trait, a self-discipline sub-trait, and a self-efficacy sub-trait; wherein the extraversion trait includes at least one of an activity level sub-trait, a cheerfulness sub-trait, an excitement-seeking sub-trait, a friendliness sub-trait, and a gregariousness sub-trait; wherein the emotional range trait includes at least one of an anger sub-trait, an anxiety sub-trait, a depression sub-trait, an immoderation sub-trait, a self-consciousness sub-trait, and a vulnerability sub-trait; and
the openness trait includes at least one of an adventurousness sub-trait, an artistic interests sub-trait, an emotionality sub-trait, an imagination sub-trait, an intellect sub-trait, and a liberalism sub-trait.

8. A device comprising:
processing circuitry configured to:
analyze a set of writing samples provided by a user for evidence of each writing style trait of pre-defined writing style traits;
assign a sub-trait score for each writing style trait, the sub-trait score indicating the amount of evidence of the writing style trait in the set of writing samples;
generate a first key score by a key generating device associated with a writing profile of the user having a first account, the first key score indicating a first writing style of the user according to an aggregate sub-trait score being a mathematical combination of sub-trait scores of each writing style trait;
generate a second key score by the key generating device based on a first document posted by the first account, the second key score indicating a second writing style exhibited by the first document;
compare the first key score to the second key score to determine a degree of dissimilarity between the first writing style and the second writing style;
assign authorship of the first document to the user based on the first key score and the second key score having a degree of dissimilarity below a threshold level; and
monitor for a second document to be posted by the first account.

9. The device according to claim 8, wherein authorship of the first document is not assigned to the user when the degree of dissimilarity between the first key score and second key score is above the threshold level.

10. The device according to claim 8, the processing circuitry further configured to:
update the writing profile of the user based on the second key score for the first document, wherein the writing profile is based on aggregate sub-trait scores of a plurality of documents written by the user including the first document.

11. The device according to claim 8, the processing circuitry further configured to:
determine a Sybil attack has occurred when a threshold number of key scores for documents in product reviews on a website have a degree of dissimilarity below the threshold level.

12. The device according to claim 8, wherein:
the agreeableness trait includes an altruism sub-trait, a cooperation sub-trait, a modesty sub-trait, a morality sub-trait, a sympathy sub-trait, and a trust sub-trait; the conscientiousness trait includes an achievement-striving sub-trait, a cautiousness sub-trait, a dutifulness sub-trait, an orderliness sub-trait, a self-discipline sub-trait, and a self-efficacy sub-trait;
the extraversion trait includes an activity level sub-trait, a cheerfulness sub-trait, an excitement-seeking sub-trait, a friendliness sub-trait, and a gregariousness sub-trait; wherein the emotional range trait includes an anger sub-trait, an anxiety sub-trait, a depression sub-trait, an immoderation sub-trait, a self-consciousness sub-trait, and a vulnerability sub-trait; and
the openness trait includes an adventurousness sub-trait, an artistic interests sub-trait, an emotionality sub-trait, an imagination sub-trait, an intellect sub-trait, and a liberalism sub-trait.

13. The device according to claim 8, wherein the set of writing samples is obtained from a member of the group consisting of: (i) a web log associated with the first account, (ii) a social media post by the first account, (iii) a product review posted by the first account, (iv) a service review posted by the first account, and (v) a comment posted by the first account.

14. The device according to claim 8, wherein the pre-defined writing style traits include an agreeableness trait, a conscientiousness trait, an extraversion trait, an emotional range trait, and an openness trait.

15. A computer program product comprising a non-transitory computer-readable medium having a set of instructions stored thereon which, when executed by a processor, causes the processor to perform a method comprising:
analyzing a set of writing samples provided by a user for evidence of each writing style trait of pre-defined writing style traits;
assigning a sub-trait score for each writing style trait, the sub-trait score indicating the amount of evidence of the writing style trait in the set of writing samples;
generating a first key score by a key generating device associated with a writing profile of the user having a first account, the first key score indicating a first writing style of the user according to an aggregate sub-trait score being a mathematical combination of sub-trait scores of each writing style trait;
generating a second key score by the key generating device based on a first document posted by the first account, the second key score indicating a second writing style exhibited by the first document;
comparing the first key score to the second key score to determine a degree of dissimilarity between the first writing style and the second writing style;
assigning authorship of the first document to the user based on the first key score and the second key score having a degree of dissimilarity below a threshold level; and
monitoring for a second document to be posted by the first account.

16. The computer program product of claim 15, wherein authorship of the first document is not assigned to the user when the degree of dissimilarity between the first key score and second key score is above the threshold level.

17. The computer program product of claim 15, further causing the computer to perform the method comprising:
updating the writing profile of the user based on the second key score for the first document, wherein the writing profile is based on aggregate sub-trait scores of a plurality of documents written by the user including the first document.

18. The computer program product of claim 15, further causing the computer to perform the method comprising:
determining a Sybil attack has occurred when a threshold number of key scores for documents in product reviews on a website have a degree of dissimilarity below the threshold level.

19. The computer program product of claim 15, wherein the pre-defined writing style traits include an agreeableness trait, a conscientiousness trait, an extraversion trait, an emotional range trait, and an openness trait.

20. The computer program product of claim 19, wherein:
the agreeableness trait includes at least one of an altruism sub-trait, a cooperation sub-trait, a modesty sub-trait, a morality sub-trait, a sympathy sub-trait, and a trust sub-trait;
the conscientiousness trait includes at least one of an achievement-striving sub-trait, a cautiousness sub-trait, a dutifulness sub-trait, an orderliness sub-trait, a self-discipline sub-trait, and a self-efficacy sub-trait; wherein the extraversion trait includes at least one of an activity level sub-trait, a cheerfulness sub-trait, an excitement-seeking sub-trait, a friendliness sub-trait, and a gregariousness sub-trait; wherein the emotional range trait includes at least one of an anger sub-trait, an anxiety sub-trait, a depression sub-trait, an immoderation sub-trait, a self-consciousness sub-trait, and a vulnerability sub-trait; and
the openness trait includes at least one of an adventurousness sub-trait, an artistic interests sub-trait, an emotionality sub-trait, an imagination sub-trait, an intellect sub-trait, and a liberalism sub-trait.

\* \* \* \* \*